United States Patent [19]

Reinicke

[11] 3,814,376

[45] June 4, 1974

[54] SOLENOID OPERATED VALVE WITH MAGNETIC LATCH

[75] Inventor: Robert H. Reinicke, Mission Viejo, Calif.

[73] Assignee: Parker-Hannefin Corporation, Cleveland, Ohio

[22] Filed: Aug. 9, 1972

[21] Appl. No.: 279,048

[52] U.S. Cl. ............. 251/65, 251/137, 251/141, 335/234
[51] Int. Cl. ................. F16k 31/08, H01f 7/08
[58] Field of Search ......... 251/129, 65, 137, 141, 251/625.64, 625.65; 335/234, 257, 277

[56] References Cited
UNITED STATES PATENTS

| | | | |
|---|---|---|---|
| 2,515,029 | 7/1950 | Almond et al. | 251/137 X |
| 2,579,723 | 12/1951 | Best | 251/65 |
| 3,040,217 | 6/1962 | Conrad | 335/234 |
| 3,178,151 | 4/1965 | Caldwell | 251/137 |
| 3,203,447 | 8/1965 | Bremner et al. | 251/65 X |
| 3,368,788 | 2/1968 | Padula | 251/65 |
| 3,379,214 | 4/1968 | Weinberg | 251/65 X |
| 3,458,769 | 7/1969 | Stampfli | 137/625.64 X |
| 3,460,081 | 8/1969 | Tillman | 335/234 |
| 3,542,333 | 11/1970 | Stampfli | 251/129 X |
| 3,608,585 | 9/1971 | Huntington | 137/625.65 |

Primary Examiner—Arnold Rosenthal
Attorney, Agent, or Firm—John N. Wolfram

[57] ABSTRACT

A magnetically operated two position latching valve having an armature that also serves as a movable valve element and which is movable to its two positions by and latched in said positions solely by magnetic flux. The valve is moved to one position or the other by applying current to a solenoid means in one direction or the other and is latched in either selected position by a single permanent magnet whose flux is automatically switched to the proper direction for holding the armature in the selected position.

3 Claims, 3 Drawing Figures

SOLENOID OPERATED VALVE WITH MAGNETIC LATCH

BACKGROUND OF THE INVENTION

In many applications, particularly in aircraft hydraulic systems, it is highly desirable to have electrically controlled valves within the system operate with very fast response time and with low power consumption. Heretofore this has been accomplished with the use of torque motors, that is, rotary actuators, using both permanent and electromagnets for actuating the valving. However, such torque motor actuated valves are complicated, expensive, and relatively bulky and heavy.

SUMMARY OF THE INVENTION

The present invention provides a linear motion two position valve that utilizes both permanent and electromagnets to provide fast response and low power consumption, and with magnetic latching in both positions. This is accomplished by utilizing a linear motion armature that also serves as the movable valve member, providing a permanent magnet to latch the armature in either valve open or valve closed position, and using a pair of like wound solenoid coils for moving the armature from one position to the other. The coils are momentarily energized with current flowing in one direction to move the armature from a given one of the two positions to the other, and momentarily energized with current flowing in the opposite direction to move the armature in the opposite direction. The greater portion of the flux from the permanent magnet moves in one axial direction through the armature when the armature is in one of the two positions for latching the armature in that position and is switched in direction through the armature when the latter is in its other position for latching the armature in such other position.

U.S. Letters Pat. No. 2,579,723 utilizes a pair of solenoid coils with a permanent magnet therebetween for producing linear movement of an armature but does not utilize the armature as a valve member and is incapable of latching the armature in the valve open and valve closed positions.

DETAIL DESCRIPTION

Figure 1:
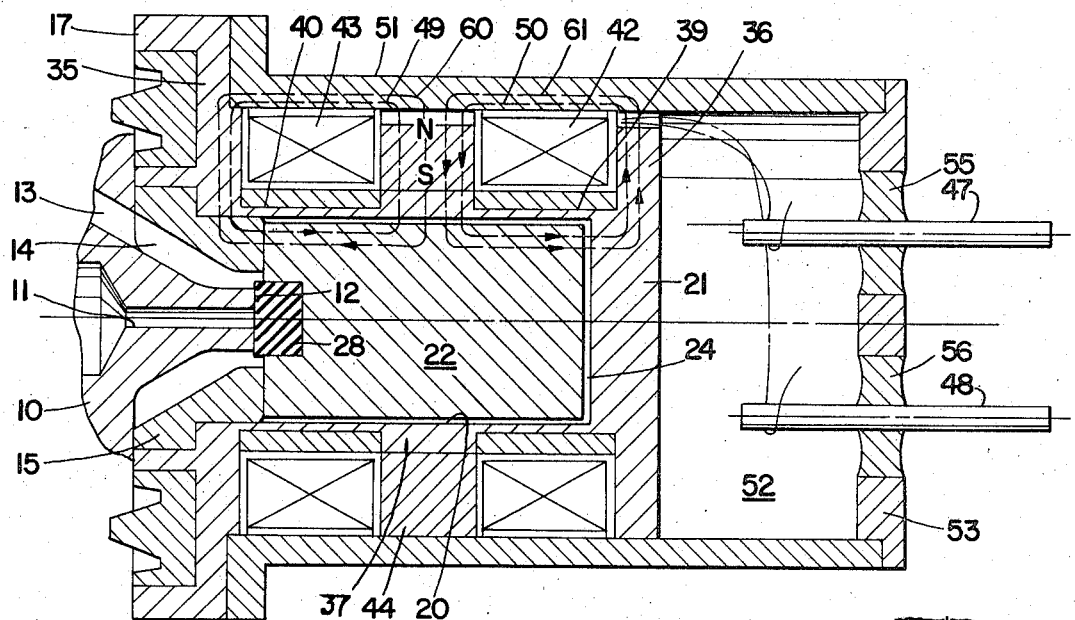
FIG. 1 is a cross section view of the valve with the armature in valve closed position.

The valve includes a valve body 10, only a portion of which is shown, having a fluid flow port 11 surrounded at one end by a flat valve seat 12 and which is to be connected and disconnected from a flow port 13 via an annular conical passage formed between valve body 10 and an insert plate 15 that is partially located within a metallic spool-like member 17. Member 17 has a bore 20 closed at one end by a plate like portion 21 and which contains an armature 22 therein.

Insert plate 15 retains armature 22 within bore 20 and is spaced from closure plate portion 21 a distance slightly greater than the length of the armature so that when the armature is against insert 15 there is a space 24 between the armature and closure plate 21, as shown in FIG. 1.

Figure 2:
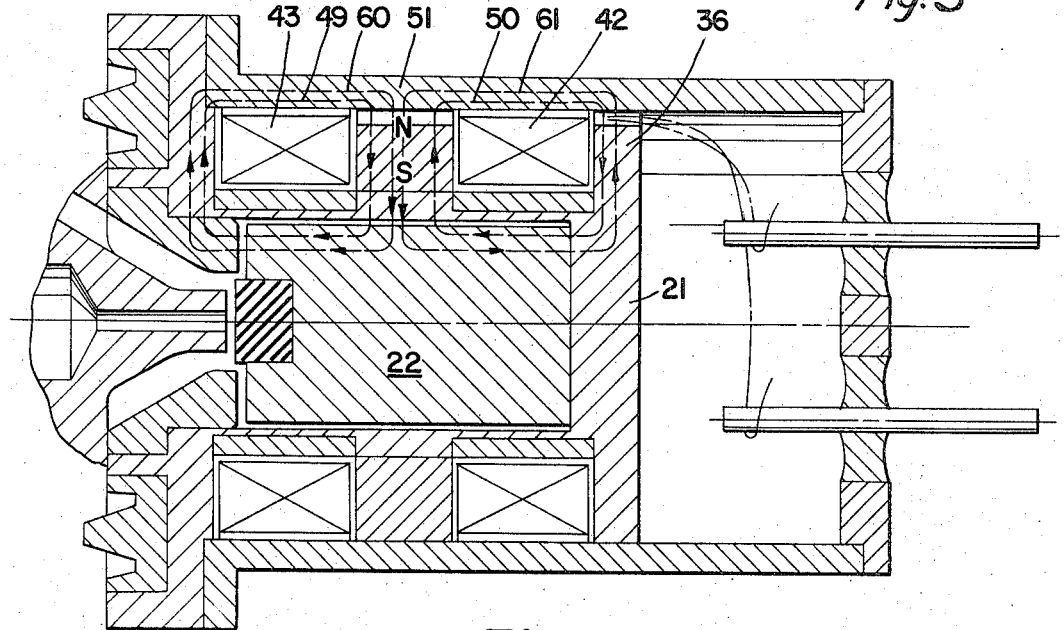
FIG. 2 is a view like FIG. 1 but showing the armature in valve open position.

When the armature is against closure plate 21 there is a space 25 between the armature and insert plate 15, as shown in FIG. 2.

Figure 3:
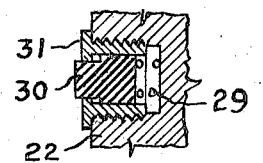
FIG. 3 is a fragmentary section view showing a modified structure for seating the valve.

Armature 22 carries a valve insert 28 of resilient material and which engages seat 24 to close off flow communication between ports 11 and 13 when the armature is against insert plate 15. Preferably, insert 28 contacts seat 12 when the armature is only a few thousandths of an inch from insert plate 15 and yields somewhat to permit contact between the armature and insert plate 15 to thus assure closure of the valve despite manufacturing variations in the dimensions of the parts. An optional construction for this purpose, shown in FIG. 3, is to mount a spring 29 behind an insert 30 that extends the latter from the armature a sufficient amount to insure contact with seat 12 before the armature contacts insert plate 15 and which spring then yields to permit retraction of insert 30 relative to the armature to permit seating of the latter against insert plate 15. The insert is retained by a threaded plug 31.

Member 17 has radial flange portions 35, 36 at its opposite ends and a rib 37 intermediate its ends which form annular grooves 39, 40 in which are respectively mounted a pair of solenoid coils 42, 43. Mounted on rib 37 is an annular permanent magnet 44 having radial N-S polarity as shown in the drawing.

Coils 42 and 43 are preferably connected in parallel, but may be in series, between terminals 47, 48 and their windings are in the same direction whereby upon energization of the coils via terminals 47, 48 with a given polarity, their flux paths 49, 50 through armature 22 will be in the same direction.

Surrounding the coils and magnet is a cylindrical member 51 that is in contact with flanges 35, 36 to provide a flux path therewith. Member 51 extends beyond flange 36 to provide a chamber 52 that is closed by a plate 53 through which contacts 47, 48 extend and which are electrically isolated from plate 53 by dielectric plugs 55, 56.

OPERATION

When armature 22 is in the position shown in FIG. 1 and with solenoids 42, 43 deenergized, the greater portion of the flux from permanent magnet 44 will follow path 60 due to contact of the armature with plate 15 to urge the armature toward closed position against valve seat 12. At this time there will be very little flux from the permanent magnet following path 61 to urge the armature in the opposite direction because of the resistance provided by air gap 24. As a result, the flux in path 60 holds the armature in valve closing position.

Upon momentary energization of both coils 42, 43 with appropriate polarity of the current at contacts 47, 48 the coils will establish electromagnetic flux paths 49, 50 through the armature in a direction opposite that of permanent magnet flux path 49 to overcome the latter and move the armature to the valve open position of FIG. 2. In this position the permanent magnet flux switches over so that most of the flux now follows path 61 because of the contact of the armature with plate 21 and very little flux follows path 60 because of air gap 25. Now, upon deenergization of the coils the stronger flux in path 61 holds the armature against plate 21 in valve open position.

To close the valve, the coils are again momentarily energized but with polarity of the current the reverse of the polarity when it is desired to open the valve. This causes flux paths 49, 50 to have the directions indicated in FIG. 2 for overcoming the oppositely directed flux in permanent magnet flux path 61 and cause the armature to move to its valve closing position of FIG. 1 and to switch most of the permanent magnet flux to path 60 for latching the armature in valve closing position when the coils are again deenergized.

Although for convenience it is indicated that the flux for coil 42 follows path 50 and flux for coil 43 follows path 49, in reality a considerable amount of the flux from the two coils does not pass through permanent magnet 44 because of the low permeability thereof but passes around the magnet through members 51, 35, 15, 22 and 21 with the same effect of adding to and substracting from permanent magnet flux in paths 49, 50 as the electromagnetic flux in paths 49, 50. In other words the same net adding and substracting effect is obtained regardless of how much of the electromagnetic flux passes through or bypasses the permanent magnet.

In this invention the permanent magnet always remains at a constant flux level and the major portion of its output is simply switched from one end wall or pole face to the other for latching the armature-valve element in the selected open or closed position. This constant flux operation is much more efficient than other arrangements that charge and discharge the magnet during each cycle of valve operation.

With the present construction in which the armature also serves as the movable valve member and has no spring or other mechanically applied forces thereon, the mass of the armature can be minimized, resulting in a smaller total magnetic latching force requirement, smaller coils and permanent magnet, and hence in a valve of less bulk and weight than comparable valves of other construction. These factors are, of course, of considerable advantage in valves for aircraft use.

I claim:

1. A magnetically operated valve comprising a body having first and second flow passages therein and a valve seat surrounding one of the flow passages, said body including a solenoid housing, said housing having a chamber therein defined by a magnetizable shell portion of said housing provided with magnetizable first and second spaced end walls, an armature within the chamber between said end walls and movable from a first position in contact with the first end wall and out of contact with the second end wall to a second position in contact with the second end wall and out of contact with the first end wall, said armature having a valve face thereon engageable with said valve seat in one of said positions and out of contact with said seat in the other of said positions, said armature being devoid of any mechanical force acting thereupon tending to maintain the armature in a position out of contact with either end wall, an annular permanent magnet in said chamber having radially outer and inner poles respectively within said shell portion and surrounding the armature, a first solenoid coil in said chamber on one side of the magnet and a second solenoid in said chamber on the other side of the magnet, said shell portion and end walls of said housing and said armature providing first and second oppositely directed flux paths for said magnet, the first flux path being from the armature to the first end wall and the second flux path being from the armature to the second end wall, the first flux path having more flux therein than the second flux path when the armature is against the first end wall and the second flux path having more flux therein than the first flux path when the armature is against the second end wall, and said coils being energizable with current flowing therethrough in one direction when the armature is against said first end wall to create magnetic flux in said armature flowing in a direction to overcome the flux of the permanent magnet holding the armature against said first end wall, and said coils being energizable with current flowing therethrough in an opposite direction when the armature is against said second end wall to create magnetic flux in said armature flowing in a direction to overcome the flux of the permanent magnet holding the armature against said second end wall, and said valve face contacts said seat before said armature contacts the respective end wall and is yieldable to permit contact of the armature with said respective end wall.

2. A magnetically operated valve comprising a body having first and second flow passages therein and a valve seat surrounding one of the flow passages, said body including a solenoid housing, said housing having a chamber therein defined by a magnetizable shell portion of said housing provided with magnetizable first and second spaced end walls, an armature within the chamber between said end walls and movable from a first position in contact with the first end wall and out of contact with the second end wall to a second position in contact with the second end wall and out of contact with the first end wall, said armature having a valve face thereon engageable with said valve seat in one of said positions and out of contact with said seat in the other of said positions, said armature being devoid of any mechanical force acting thereupon tending to maintain the armature in a position out of contact with either end wall, an annular permanent magnet in said chamber having radially outer and inner poles respectively within said shell portion and surrounding the armature, a first solenoid coil in said chamber on one side of the magnet and a second solenoid in said chamber on the other side of the magnet, said shell portion and end walls of said housing and said armature providing first and second oppositely directed flux paths for said magnet, the first flux path being from the armature to the first end wall and the second flux path being from the armature to the second end wall, the first flux path having more flux therein than the second flux path when the armature is against the first end wall and the second flux path having more flux therein than the first flux path when the armature is against the second end wall, and said coils being energizable with current flowing therethrough in one direction when the armature is against said first end wall to create magnetic flux in said armature flowing in a direction to overcome the flux of the permanent magnet holding the armature against said first end wall, and said coils being energizable with current flowing therethrough in an opposite direction when the armature is against said second end wall to create magnetic flux in said armature flowing in a direction to overcome the flux of the permanent magnet holding the armature against said second end wall, and said flow passages are open to one of said end walls and in which said valve face is at one end of said armature to engage said seat in said first position of said armature.

3. A magnetically operated valve comprising a body having first and second flow passages therein and a valve seat surrounding one of the flow passages, said body including a solenoid housing, said housing having a chamber therein defined by a magnetizable shell portion of said housing provided with magnetizable first and second spaced end walls, an armature within the chamber between said end walls and movable from a first position in contact with the first end wall and out of contact with the second end wall to a second position in contact with the second end wall and out of contact with the first end wall, said armature having a valve face thereon engageable with said valve seat in one of said positions and out of contact with said seat in the other of said positions, said armature being devoid of any mechanical force acting thereupon tending to maintain the armature in a position out of contact with either end wall, an annular permanent magnet in said chamber having radially outer and inner poles respectively within said shell portion and surrounding the armature, a first solenoid coil in said chamber on one side of the magnet and a second solenoid in said chamber on the other side of the magnet, said shell portion and end walls of said housing and said armature providing first and second oppositely directed flux paths for said magnet, the first flux path being from the armature to the first end wall and the second flux path being from the armature to the second end wall, the first flux path having more flux therein than the second flux path when the armature is against the first end wall and the second flux path having more flux therein than the first flux path when the armature is against the second end wall, and said coils being energizable with current flowing therethrough in one direction when the armature is against said first end wall to create magnetic flux in said armature flowing in a direction to overcome the flux of the permanent magnet holding the armature against said first end wall, and said coils being energizable with current flowing therethrough in an opposite direction when the armature is against said second end wall to create magnetic flux in said armature flowing in a direction to overcome the flux of the permanent magnet holding the armature against said second end wall, and said housing includes an inner shell portion within said magnet and coils, said armature being movable in a bore in said inner shell portion, and said bore being closed by said end walls except for said passages.

* * * * *